United States Patent
Miranda et al.

(10) Patent No.: US 10,657,718 B1
(45) Date of Patent: May 19, 2020

(54) FACIAL EXPRESSION TRACKING DURING AUGMENTED AND VIRTUAL REALITY SESSIONS

(71) Applicant: Wells Fargo Bank, N.A., San Francisco, CA (US)

(72) Inventors: Darius A. Miranda, San Francisco, CA (US); Chris Kalaboukis, San Jose, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 95 days.

(21) Appl. No.: 15/339,440

(22) Filed: Oct. 31, 2016

(51) Int. Cl.
*G06Q 10/00* (2012.01)
*G06T 19/00* (2011.01)
*G06K 9/00* (2006.01)

(52) U.S. Cl.
CPC ........ *G06T 19/006* (2013.01); *G06K 9/00302* (2013.01)

(58) Field of Classification Search
CPC ............... G06Q 30/02; G06Q 30/0242; G06K 9/00315; G06K 9/00302; G06K 9/00335; G06K 9/00221; G06K 9/00308; G06F 2203/011; G06F 3/011; H04N 21/44218; H04N 5/23219; H04H 60/33
See application file for complete search history.

(56) References Cited

U.S. PATENT DOCUMENTS

| | | | |
|---|---|---|---|
| 7,233,684 B2* | 6/2007 | Fedorovskaya ... | G06F 17/30265 382/118 |
| 7,418,116 B2 | 8/2008 | Fedorovskaya et al. | |
| 7,643,658 B2 | 1/2010 | Kilner et al. | |
| 7,921,036 B1 | 4/2011 | Sharma et al. | |
| 7,930,199 B1 | 4/2011 | Hill | |
| 8,219,438 B1 | 7/2012 | Moon et al. | |
| 8,235,725 B1* | 8/2012 | Hill ........................ | G06Q 30/02 434/236 |
| 8,462,996 B2 | 6/2013 | Moon et al. | |
| 9,031,293 B2 | 5/2015 | Kalinli-Akbacak | |
| 9,106,958 B2 | 8/2015 | el Kaliouby et al. | |
| 2003/0108241 A1* | 6/2003 | Colmenarez ...... | G06F 17/30265 382/181 |
| 2008/0043013 A1 | 2/2008 | Gruttadauria et al. | |
| 2008/0195438 A1* | 8/2008 | Manfredi ............... | G06Q 40/02 |
| 2009/0299814 A1 | 12/2009 | Grigsby et al. | |

(Continued)

FOREIGN PATENT DOCUMENTS

WO 2015145219 A1 10/2015

OTHER PUBLICATIONS

Bignéet al., "Elapsed time on first buying triggers brand choices within a category: A virtual reality-based study," Journal of Business Research 69.4, Apr. 2016, 4 pages.

(Continued)

*Primary Examiner* — Kim Y Vu
*Assistant Examiner* — Michael J Vanchy, Jr.
(74) *Attorney, Agent, or Firm* — Merchant & Gould P.C.

(57) ABSTRACT

An example method for estimating an emotion based upon a facial expression of a user can include: receiving one or more captured facial expressions from the user at a visual computing device; comparing the one or more captured facial expressions to one or more known facial expressions; and assigning an emotion to the plurality of captured facial expressions based upon the comparing.

15 Claims, 7 Drawing Sheets

(56) References Cited

U.S. PATENT DOCUMENTS

| | | | | |
|---|---|---|---|---|
| 2010/0328492 | A1* | 12/2010 | Fedorovskaya | G06K 9/4671 348/231.2 |
| 2011/0038547 | A1* | 2/2011 | Hill | G06K 9/00281 382/195 |
| 2013/0110666 | A1* | 5/2013 | Aubrey | G06Q 30/0269 705/26.5 |
| 2013/0162524 | A1* | 6/2013 | Li | G06K 9/00 345/156 |
| 2014/0244476 | A1* | 8/2014 | Shvarts | G06Q 40/025 705/38 |
| 2014/0363059 | A1 | 12/2014 | Hurewitz | |
| 2015/0193507 | A1 | 7/2015 | Rappoport et al. | |
| 2015/0206000 | A1* | 7/2015 | el Kaliouby | G06K 9/00315 382/118 |
| 2015/0206218 | A1* | 7/2015 | Banerjee | G06Q 30/0623 705/26.61 |
| 2015/0286638 | A1* | 10/2015 | Li | G06K 9/00268 382/190 |
| 2015/0381885 | A1* | 12/2015 | Kim | H04N 5/23219 348/207.1 |
| 2016/0042648 | A1 | 2/2016 | Kothuri | |
| 2016/0170996 | A1 | 6/2016 | Frank et al. | |

OTHER PUBLICATIONS

Fintech, "25 Geniuses Who are Creating the Future of Business," http://fintechranking.com/2016/04/27/25-genuises-who-are-creating-the-future-of-business/, Apr. 27, 2016, 39 pages.

Sherwin, Adam, "BBC to use face-scanning technology to shed light on viewers' tastes," http://www.independent.co.uk/life-style/gadgets-and-tech/news/bbc-to-use-face-scanning-technology-to-shed-light-on-viewers-tastes-a6866041.html, Feb. 10, 2016, 6 pages.

Ahn et al., "Facial Expressions as Predictors of Online Buying Intention," http://vhil.stanford.edu/mm/2008/ahn-facial-expressions.pdf, 2008, 23 pages.

Yeasin et al., "Recognition of Facial Expressions and Measurement of Levels of Interest from Video," IEEE Transactions on Multimedia, vol. 8, No. 3, Jun. 2006, pp. 500-508.

\* cited by examiner

FACIAL EXPRESSION TRACKING DURING AUGMENTED AND VIRTUAL REALITY SESSIONS

BACKGROUND

Augmented reality is a technology that can superimpose a virtual image over an actual scene. Virtual reality is a technology that can provide a computer generated simulation of a scene. A user can view the computer simulation of the scene with a virtual reality device such as a virtual reality headset. Augmented reality devices and virtual reality devices can be considered to be visual computing devices.

When a user views a scene with a visual computing device, the scene can be viewed from a perspective of the user. A user of an augmented reality device can view the scene looking outward through the augmented reality device. A user of a virtual reality device can view images generated on the virtual reality headset.

SUMMARY

In one aspect, an example method for estimating an emotion based upon a facial expression of a user can include: receiving one or more captured facial expressions from the user at a visual computing device; comparing the one or more captured facial expressions to one or more known facial expressions; and assigning an emotion to the plurality of captured facial expressions based upon the comparing.

In another aspect, an example visual computing device that can be worn by a user can include: a processing unit; system memory; a display unit on which one or more virtual images can be projected; and a plurality of cameras, the plurality of cameras being oriented in an inwardly-facing direction towards a face of the user.

In yet another aspect, an example method implemented on a visual computing device can include: displaying, by the visual computing device, a first image to a user; capturing a facial expression of the user as a result of the user viewing the first image on the visual computing device, the facial expression comprising a reaction of the user to the first image; identifying a user emotion associated with the facial expression; determining when the user emotion is negative; and when the user emotion is negative, displaying a second image to the user, the second image being a modification of the first image or a new image.

The details of one or more techniques are set forth in the accompanying drawings and the description below. Other features, objects, and advantages of these techniques will be apparent from the description, drawings, and claims.

DETAILED DESCRIPTION

Figure 1:
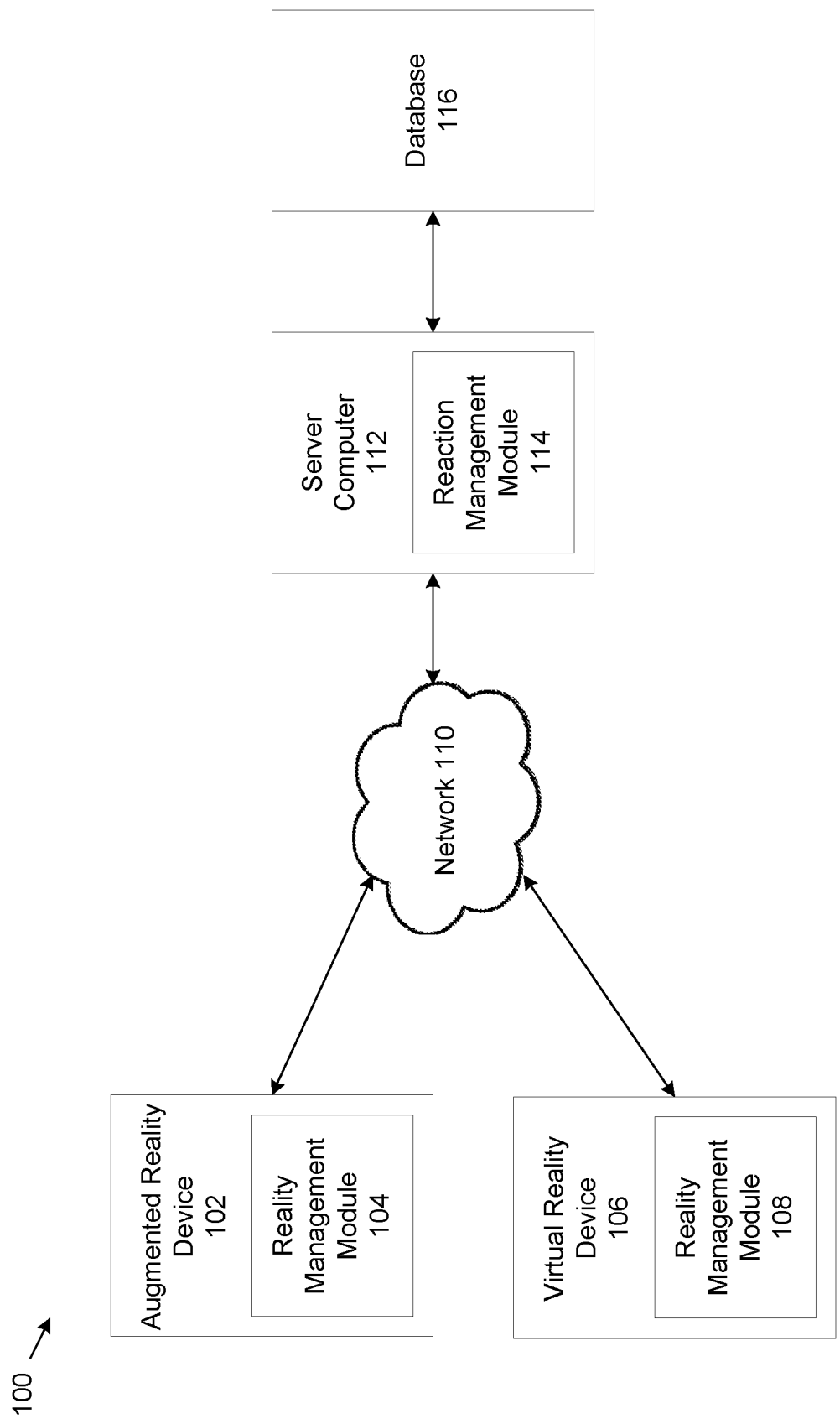
FIG. 1 shows an example system that supports facial expression tracking during augmented reality and virtual reality sessions.

The present disclosure is directed to systems and methods for capturing and tracking user facial expressions when using a visual computing device, such as an augmented reality (AR) or a virtual reality (VR) device. Using the systems and methods, the visual computing device can be modified to include one or more cameras that face inward and which can capture facial expressions of a user of the visual computing device. The facial expressions can be used to ascertain an emotional state of the user when viewing a scene with the visual computing device.

Based on the emotional state of the user, different imagery can be displayed on the visual computing device to attempt to impact the emotional state of the user. For example, if the user is viewing a scene involving a car and a negative emotional state is detected, an image of a different car can be presented in an attempt to create a positive emotional state for the user. As another example, if the user is viewing a financial statement or a financial health status and a negative emotional state is detected, different future financial scenarios, including action steps that can be taken, can be presented to the user in an attempt to provide a preferable emotional state for the user.

Using the systems and methods, a user's emotional reaction to a series of images can be captured and saved to create a baseline of emotional reactions for the user. An initial training period can be used to create the baseline of emotional reactions. Each image presented to the user during the training period can evoke one or more emotional states in the user. The emotional states can be captured. In addition, the user can be asked a series questions to determine whether the user has an emotional connection to an image before the user is presented with the image. For example, the user can be asked questions relating to the user's attitude toward dogs before the user is presented one or more image of dogs. An emotional reaction from the user to each image can be compared to user's attitude toward dogs to permit a better interpretation of the user's emotional reaction.

After the training period, the user can view images on the visual computing device and the facial cameras on the visual computing device can capture and track the user's facial expressions when using the images. When the user's facial expressions change, variances of the user's facial expressions can be noted.

The user's facial expressions can be sent to an electronic computing device, for example a server computer, for analysis. The server computer can compare baseline user facial expressions obtained during the training period with the user's facial expressions when viewing images after the training period. When a match is made between a user facial expression obtained during the training period with a user facial expression for a viewed image after the training period, the server computer can designate an emotional state associated with the facial expression during the training period as an emotional state of the user when viewing the viewed image after the training period.

When the server computer determines that the emotional state of the user is a negative emotional state, for example sadness, anger or anxiety, the server computer can send an indication of the negative emotion to the visual computing device. The visual computing device can then select a new image for display on the visual computing device. The new image can be based on the current emotional state of the user and the current viewed image such that the new image may produce a positive emotional reaction in the user. For example, if the user is viewing a car that the user may consider expensive and borderline affordable, the user may experience emotions such as sadness, anxiety or anger. However, if the visual computing device selects an image for a more affordable car, taking into consideration the characteristics the user is known to want in a car, the visual computing device may detect positive emotions such as happiness and excitement. In some implementations, images for display on the visual computing device can be selected by the server computer and sent to the visual computing device.

In some implementations, instead of performing the analysis described above herein on an electronic computing device such as a server computer, the analysis can be performed on the visual computing device. For example, the visual computing device can capture and store the facial expressions of the user during the training period. The visual computing device can also access reference facial expressions from a database. In addition, the visual computing device can compare user facial expressions captured during an operational period with the facial expressions of the user during the training period and the reference facial expressions from the database to identify a current emotional state of the user. The visual computing device can also display an image on the visual computing device that can produce a positive emotion by the user.

In an example implementation using a VR device, a customer of a financial institution who is interested in purchasing a home can view a simulated image of a street with virtual representations of homes displayed on either side of the street. The financial institution can display the virtual representation of the homes based on a financial profile of the customer and a profile of the customer's current purchasing interests. The VR device can capture the customer's facial expressions while viewing the homes and send the customer's facial expressions to a server computer of the financial institution. The server computer can compare the customer's facial expressions with facial expressions of the customer captured during a training period. The server computer can then correlate facial expressions with an emotional state of the customer and attempt to determine the emotional state of the customer when viewing the homes. The VR device can also display a three-dimensional representation of the customer's current spending.

Based on the emotional state of the customer, as the customer views the homes and the customer's current spending, a determination can be made as to what types of homes the customer prefers. For example, when the emotional state of the customer is happy when viewing smaller homes but unhappy when viewing larger homes (because the larger homes are not affordable), the simulated image of the street can be replaced with a simulated image of another street which contains more small homes.

In this example, the customer can also change a geographical area of the homes, for example to a different city. For example, the VR device can provide a new simulated image showing virtual representations of homes on a street in a smaller city. However, in this example, the customer is not pleased with the smaller homes because the smaller homes are not as nice as in the previous city. The customer can then make facial expressions that can connote a negative emotional state. When the customer revises his budget allocations so that the customer can afford a better home, the VR device can display visual representations of nicer small homes for display. When the customer makes facial expressions that indicate that the customer is satisfied with the nicer smaller homes, a profile for the customer can be updated, indicating the customer likes nicer small homes of a certain price range. The updated customer profile can be used to provide better simulated images to the customer in the future.

The systems and methods disclosed herein are directed to a computer technology that can improve a customer experience when using a visual computing device, such as an AR device or a VR device. The systems and methods can permit a software application at a server computer to be trained to identify customer facial expressions when viewing images on the visual computing device and to assign an emotion to each facial expression. The system and methods can then permit the software application to identify emotional responses of the customer when viewing images and permit new images to be presented to the user to create a positive emotional response for the customer. By quickly learning how the user responds to different images, an organization can more efficiently respond to the customer's needs by presenting offers to the customer that the customer is more likely to accept.

FIG. 1 shows an example system 100 that can support facial expression tracking during augmented reality and virtual reality sessions. The example system 100 includes an augmented reality (AR) device 102, a virtual reality (VR) device 106, a network 110, a server computer 112 and a database 116. The AR device 102 includes a reality management module 104, the VR device 106 includes a reality management module 108 and the server computer 112 includes a reaction management module 114. More, fewer or different modules are possible.

The example AR device 102 is an electronic computing device with an AR functionality that can be worn or carried by the user. An example of an AR device that may be worn by the user is an AR headset. An example of an AR device that may be carried by the user is a smart telephone or tablet computer that includes AR components such as a processor, display and camera and an AR software application.

The AR headset includes a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. The optical display projects virtual images and also permits the user to see through the display. An example of an AR headset is Google Glass, from Google Inc. of Mountain View, Calif.

The example VR device 106 is an electronic computing device that supports virtual reality. Virtual reality is a computer technology that uses images, sounds and other sensations to replicate a real environment or an imaginary setting, and simulates a user's physical presence in this environment to enable the user to interact with the replicated environment. The VR device 106 can comprise a head-mounted display, such as goggles with an eye-viewable screen, that can provide a view of the replicated environment and that can permit interaction with the replicated environment. An example VR device is Oculus Rift, from Oculus VR, LLC of Irvine, Calif.

The example network 110 is a computer network such as the Internet. A user of AR device 102 or VR device 106 can login to server computer 112 across network 110.

The server computer 112 is a server computer of a business organization such as a financial institution, a retail organization or another organization that can provide products or services to a customer of the organization. Server computer 112 can interface with users at AR device 102 and VR device 108 via network 110. More than one server computer can be used.

Database 116 is an electronic database that can store financial and other profiles of the customer including a profile of user interests. Database 116 can also store virtual images that can be displayed on AR device 102 and VR device 106. In addition, database 116 can store data regarding facial expressions and emotional reactions of the user obtained during and after the training period. Database 116 can be accessed via server computer 112.

The example reality management module 104 and reality management module 108 manage display presentations on AR device 102 and VR device 106, respectively to provide appropriate virtual image displays to the user. The virtual image displays can be obtained from server computer 112 based on a current location of the user, a profile of user interests, a financial health status of the user and an identified emotional state of the user. The reality management module 104 and reality management module 108 determine where to place a virtual image display in a current view of the user on AR device 102 or VR device 106.

The example reaction management module 114 receives user facial expression data both during the training period for the user and during an operational period. The reaction management module 114 creates a baseline of the user's emotional expressions during the training period and compares the user's facial expressions during the operational period with the user's emotional expressions during the training period. As a result of the comparison, the reaction management module 114 can determine user emotional reactions during the operational period. The reaction management module 114 can communicate the emotional reactions to reality management module 104 or reality management module 108.

The reaction management module 114 can also personalize the baseline of the user's emotional expressions based on the user's particular reaction to an image, based on the responses of the user to the series of questions that can be asked the user about the image to attempt to gauge an emotional connection of the image to the user and based on learned patterns of the user's facial expressions over time. The reaction management module 114 can personalize the baseline of the user's emotional expressions because the user's facial expressions may be unclear. The same facial expression from different users may connote different emotions. For example, a facial expression that the reaction management module 114 can interpret as a "sour face" may represent sadness for one person but may represent joy for another person. In addition, one person may have more extreme emotions, whereas another person may have more moderate emotions with more or less subtle variation. Furthermore, establishing learned patterns or a chronology of emotions over time can further determine which next images to show to the user.

In some implementations, the reaction management module 114 can also send one or more virtual images to reality management module 104 or reality management module 108. In other implementations, the reality management module 104 or reality management module 108 can obtain the one or more virtual images from virtual images that are stored on AR device 102 or VR device 106 or that have been previously downloaded to AR device 102 or VR device 106.

In some implementations, the functionality of the reaction management module 114 described above herein can also be performed on AR device 102 or VR device 106.

Figure 2:
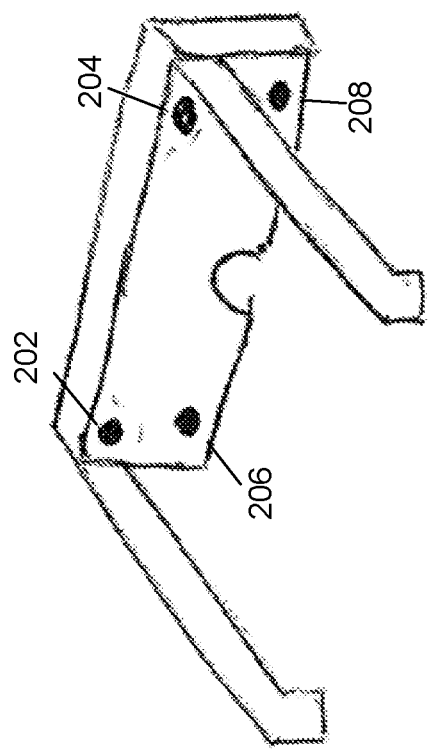
FIG. 2 shows example augmented reality goggles.

FIG. 2 shows an example AR device 102 that comprises AR goggles. The AR device 102 includes four example inwardly-facing cameras 202, 204, 206 and 208. The four inwardly-facing cameras 202, 204, 206, 208 can be located at corners of the AR device 102, within a field of view of a user of AR device 102 and be oriented in an inward direction to the user of AR device 102. The inwardly-facing cameras 202, 204, 206 and 208 can capture facial expressions of the user as the user views virtual images on AR device 102. AR device 102 can send the captured facial expressions to server computer 112.

Figure 3:
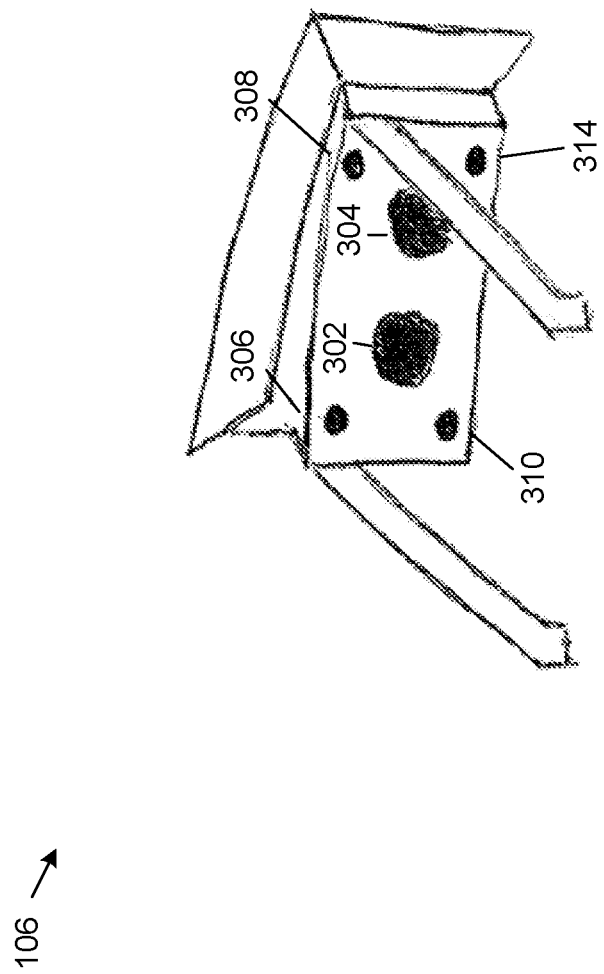
FIG. 3 shows example virtual reality goggles.

FIG. 3 shows an example VR device 106 that comprises VR goggles. The VR device 106 includes a lens and display 302 for one eye and a lens and display 304 for another eye. Each lens and display 302, 304 can focus a picture for each eye and create a stereoscopic 3D image. The VR device 106 also includes four example inwardly-facing cameras 306, 308, 310 and 314. The four inwardly-facing cameras are located within a field of view of a user of VR device 106 and are oriented in an inward direction to the user of VR device 106. A VR image can be displayed on VR device 106 using lens and display 302 and lens and display 304. The inwardly-facing cameras 306, 308, 310 and 314 can capture facial expressions of the user as the user view virtual images on VR device 106. VR device 106 can send the captured facial expressions to server computer 112.

Figure 4:
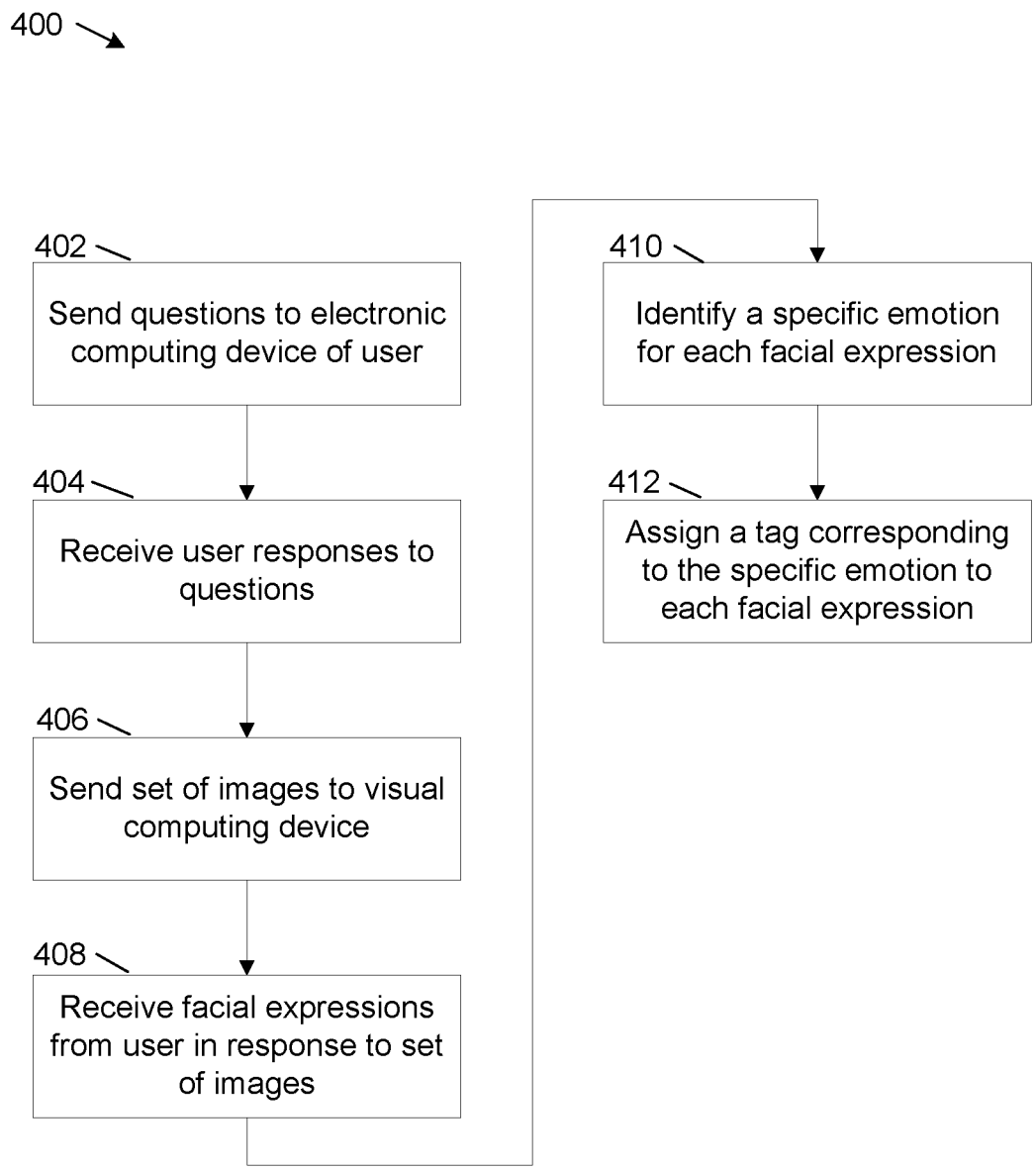
FIG. 4 shows a method implemented on the server computer of FIG. 1 for training the server computer to identify and recognize facial expressions of a user.

FIG. 4 shows a flowchart of an example method 400 for training a server computer to identify and recognize facial expressions of a user when the user views virtual images on a visual computing device. For the example method 400, the server computer is server computer 112.

At operation 402, questions are sent to an electronic computing device of the user, such as a smart phone, tablet computer, laptop computer or desktop computer. The questions relate to topics or items that can invoke different emotional states in the user. The questions are sent to the user before the user views virtual images corresponding the topics or items. The intent of the questions is to attempt to identify an emotional connection the user may have with the topic or item.

For example, one or more questions can elicit the user's opinion of pets such as dogs and cats. Other questions can elicit the user's opinions regarding vehicles, such as what vehicles the user would enjoy owning and what price range the user would want to pay for the vehicles. Still other questions can be directed to a style of house the user prefers, what price range the user would be interested in paying for a house, what geographical area the user prefers to live it and what specific part of the geographical area the user prefers— for example city or suburb. The questions may be directed to what may be known about the user, for example from an analysis of the user's interests, employment history and status, and current financial health, assuming this information is available. Other questions are possible.

At operation 404, server computer 112 receives user responses to the questions.

At operation 406, one or more images are sent to the visual computing device for display on a display screen of the visual computing device.

At operation 408, facial expressions of the user are received from the visual computing device. The facial expressions of the user are captured at the visual computing device in response to the user viewing the one or more images. The facial expressions are captured using the inwardly-facing cameras on the visual computing device.

At operation 410, a specific emotion for each facial expression is identified. In one implementation, the specific emotion is identified by comparing each facial expression with reference facial expressions that correspond to specific emotions. For example, one reference facial expression can show anger, another reference facial expression can show happiness, another reference facial expression can show anxiety. The reference facial expressions can be reference facial expressions corresponding to specific emotions or a composite facial expression, for example created from two or more facial expressions from operation 408 that show a specific emotion. In addition, the reference facial expression can be personalized for specific users corresponding to a baseline for the specific user. As discussed earlier herein, different users can have different emotional reactions to the same facial expression.

Software on server computer 112 can analyze aspects of each facial expression received at operation 408 with corresponding aspects of the reference facial expressions to make a determination the facial expression received at operation 408 corresponds to the specific emotion of one of the reference facial expressions. Example aspects that can be compared can include a shape of the lips, characteristics of the eyes and a tension and position of facial muscles. Other or different aspects can be compared. The analysis of the facial expressions can also take into consideration established emotional patterns of a user that can be learned over time. When a positive comparison is made, the specific emotion associated with the reference facial expression can be assigned to the facial expression received at operation 408.

At operation 412, a tag is assigned to each facial expression received at operation 408. The tag identifies the facial expression with the specific emotion identified at operation 410.

Figure 5:
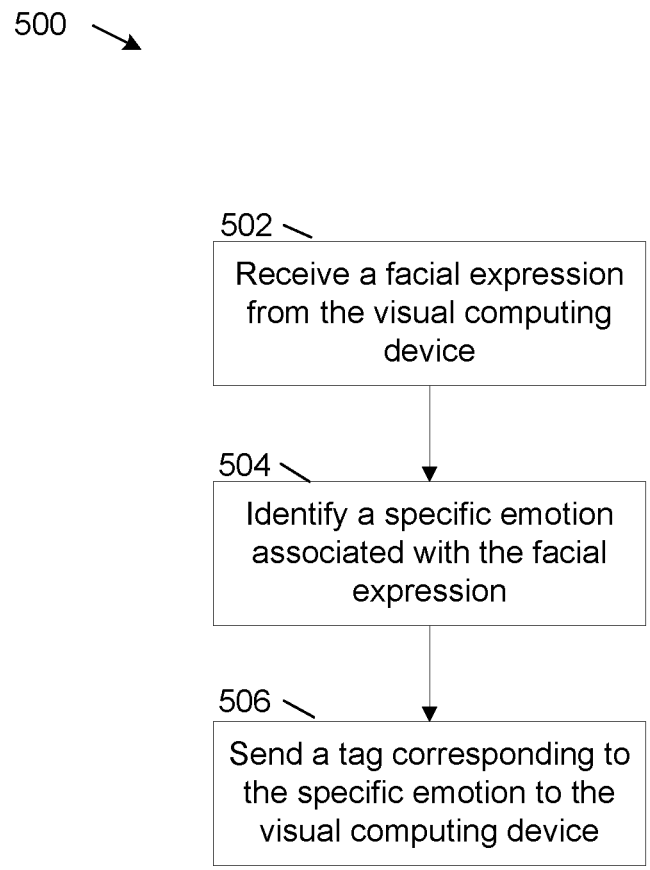
FIG. 5 shows a method implemented on the server computer of FIG. 1 for identifying facial expressions during an operational phase.

FIG. 5 shows a flowchart of an example method 500 for identifying user facial expressions during an operational phase. During the operational phase, user facial expressions are captured when the user views one or more images on the visual computing device. An attempt is then made to identify a user emotion associated with each facial expression.

At operation 502, a facial expression is received from the visual computing device. The facial expression corresponds to a reaction of the user when viewing an image on the visual computing device during the operational phase. The facial expression is captured by the inwardly-facing cameras on the visual computing device in response to the image viewed by the user on the visual computing device.

At operation 504, a specific emotion associated with the facial expression received at operation 502 is identified. The specific emotion is identified by comparing the facial expression received at operation 502 with a facial expression received during the training period or with a reference facial expression. For example, the facial expression received at operation 502 can be compared with either a facial expression received at operation 408 or a reference facial expression from operation 410.

At operation 506, a message is sent to the visual computing device with a tag that identifies the specific emotion associated with the facial expression received at operation 502.

At operation 508, a determination is made as to whether a negative emotional state is detected. A negative emotional state can comprise emotions such as anger, sadness, frustration, anxiety and other similar negative emotions.

At operation 508, when a negative emotional state is detected, at operation 510 the set of images currently displayed on the visual computing device can be modified or replaced to create a new set of images. The intent of the new set of images is to inspire a positive emotional reaction from the user. For example, if the user is viewing an image of a street scene and is reacting negatively to the homes on the street scene, the new set of images can comprise a different street scene with a different set of homes. For example the new street scene can include more or less expensive homes, depending on the user profile and the type of emotional reaction of the user to the current street scene.

At operation 512, the new set of images is sent to the visual computing device.

At operation 514, a new set of facial expressions from the user is received based on the user emotional reaction to the new set of images. Control then returns to operation 508 and a determination is made as to whether a negative emotional state is detected based on an analysis of the user facial expressions from viewing the new set of images. The process of operations 510-514 is then repeated as needed.

At operation 508, when a determination is made that a positive emotional state is detected, method 500 ends.

Figure 6:
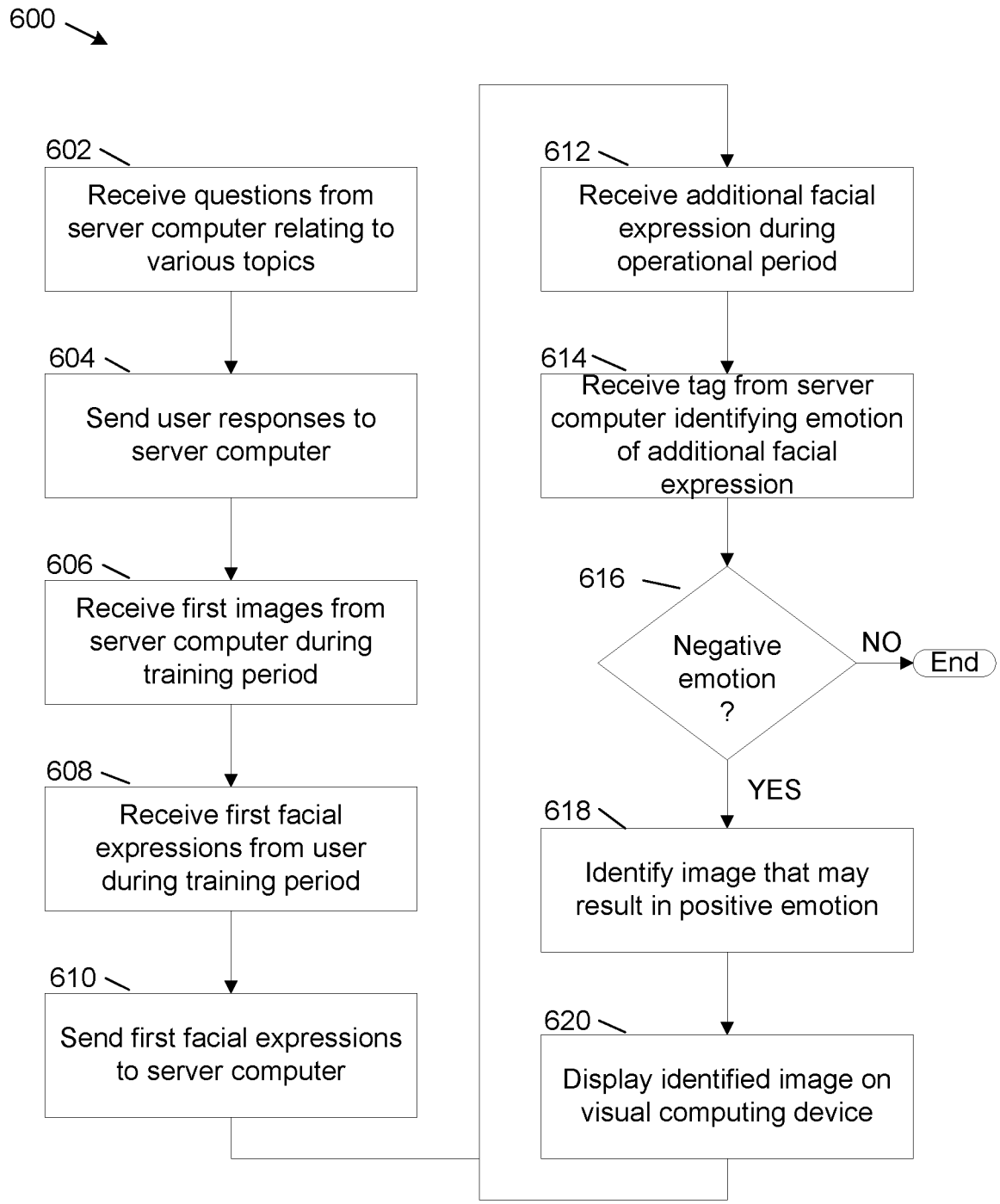
FIG. 6 shows a method implemented on a visual computing device of FIG. 1 for tracking facial expressions of a user.

FIG. 6 shows a flowchart of an example method 600 for tracking facial expressions of a user on a visual computing device. Based on an analysis of the facial expressions, a virtual image can be displayed on the visual computing device that can result in a positive emotional reaction from the user. For example method 600, the visual computing device can be an augmented reality electronics device, such as AR device 102 or a virtual reality electronics device, such as VR device 106.

At operation 602, one or more questions are received by the user from server computer 112 to determine an emotional connection of the user to certain images. The questions are part of a training period to attempt to identify an emotional reaction of the user when viewing certain images on the visual computing device. The questions can be received at an electronic computing device of the user, such as a smart phone, a tablet computer, a laptop computer or a desktop computer. In some implementations, the user can be asked to access a website associated with server computer 112 and answer the questions online.

The questions relate to a set of images that can invoke different emotional states in the user. For example, one or more questions can ask the user's opinion of pets such as dogs and cats. Other questions can ask the user's opinions regarding vehicles, such as what vehicles the user would enjoy owning and what price range the user would want to pay for the vehicles. Still other questions can be directed to a style of house the user prefers, what price range the user would be interested in paying for a house, what geographical area the user prefers to live it and what specific part of the geographical area the user prefers—for example city or suburb. The questions may be directed to what may be known about the user, for example from an analysis of the user's interests, employment history and status, and current financial health, assuming this information is available. Other questions are possible.

At operation 604, the user sends responses to the questions to server computer 112. When the questions are sent to the user on an electronic computing device of the user, the user can send to the responses to the user via the electronic computing device, for example the user's smart phone. When the user responds to the questions via a website, the user simply submits answers to the questions via the website.

At operation 606, first images for the user are received at the visual computing device. The first images are received as part of the training period for server computer 112. The first images can correspond to topics corresponding to questions asked the user at operation 604.

At operation 608, the visual computing device captures facial expressions of the user as the user views the first image on the visual computing device. Inwardly-facing cameras on the visual computing device can capture the facial expressions of the user.

At operation 610, the facial expressions of the user are sent to server computer 112. Server computer 112 attempts to identify an emotional state associated with the facial expression of the user, using the actual facial expression and information from the answered questions.

At operation 612, during an operational period following the training period, an additional facial expression is received at the visual computing device. The additional facial expression corresponds to an emotional reaction of the user to an image displayed on the visual computing device during the operational period.

At operation 614, a message is received from server computer 112 that includes a tag that identifies a specific emotion associated with the additional facial expression.

At operation 616, a determination is made as to whether the specific emotion is a negative emotion, such as anger, frustration, anxiety or unhappiness.

At operation 616, when a determination is made that the specific emotion is a negative emotion, at operation 618, an image is identified at the visual computing device that may result in a positive emotion from the user.

At operation 620, the identified image is displayed on the visual computing device. Operations 612-620 can be repeated, if necessary, to determine whether the user's emotional response to the identified image is positive, and when the user's emotional response is not positive to display one or more additional images until a positive emotional response is obtained from the user. At operation 616, when a positive emotional state is detected, method 600 ends.

Figure 7:
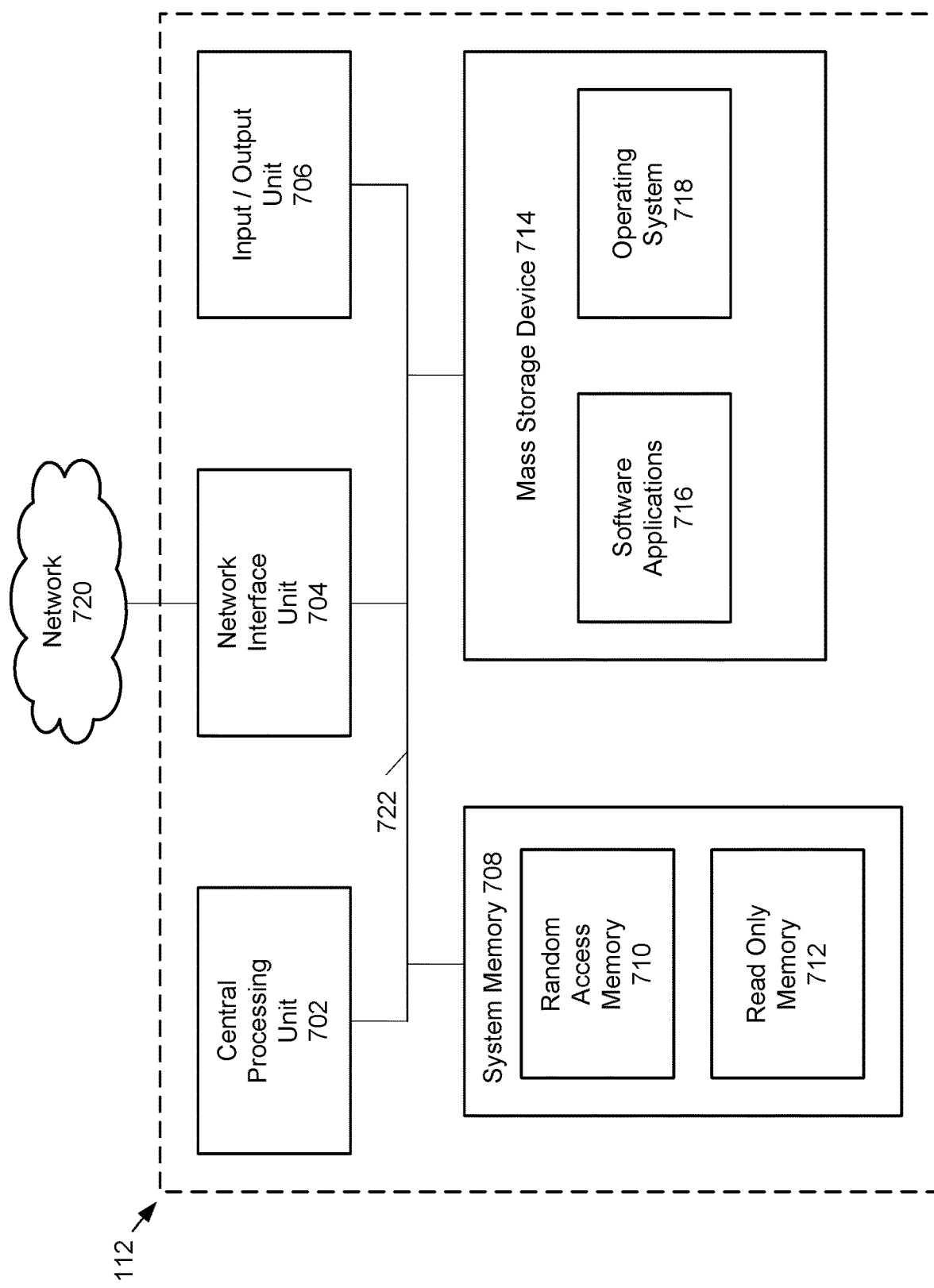
FIG. 7 shows example physical components of the server computer of FIG. 1.

As illustrated in the example of FIG. 7, server computer 112 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the server computer 112, such as during startup, is stored in the ROM 712. The server computer 112 further includes a mass storage device 714. The mass storage device 714 is able to store software instructions and data. Some or all of the components of the server computer 112 can also be included in AR device 102 and VR device 106.

The mass storage device 714 is connected to the CPU 702 through a mass storage controller (not shown) connected to the system bus 722. The mass storage device 714 and its associated computer-readable data storage media provide non-volatile, non-transitory storage for the server computer 112. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 112.

According to various embodiments of the invention, the server computer 112 may operate in a networked environment using logical connections to remote network devices through the network 720, such as a wireless network, the Internet, or another type of network. The server computer 112 may connect to the network 720 through a network interface unit 704 connected to the system bus 722. It should be appreciated that the network interface unit 704 may also be utilized to connect to other types of networks and remote computing systems. The server computer 112 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the server computer 112 can store software instructions and data. The software instructions include an operating system 718 suitable for controlling the operation of the server computer 112. The mass storage device 714 and/or the RAM 710 also store software instructions, that when executed by the CPU 702, cause the server computer 112 to provide the functionality of the server computer 112 discussed in this document. For example, the mass storage device 714 and/or the RAM 710 can store software instructions that, when executed by the CPU 702, cause the server computer 112 to display received data on the display screen of the server computer 112.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A visual computing device that can be worn by a user, the visual computing device comprising:
   a processing unit;
   system memory;
   a display unit on which one or more virtual images can be projected; and
   a plurality of cameras, the plurality of cameras being oriented in an inwardly-facing direction towards a face of the user to capture facial reactions of the user;
   wherein the system memory encodes instructions that, when executed by the processing unit, cause the visual computing device to:
      display, by the display unit, an image to the user, the image being of an item the user may be interested in purchasing;
      capture, using one or more of the plurality of cameras, a facial expression of the user as a result of the user viewing the image on the display unit, the facial expression comprising a reaction of the user to the image;

send the captured facial expression to an electronic computing device;

receive, from the electronic computing device, a message identifying an emotion of the user corresponding to the facial expression, the emotion of the user being identified via a comparison of the captured facial expression with a previous facial expression of the user obtained during a training period; and when the emotion corresponding to the captured facial expression is a negative emotion, display, by the display unit, an image of a different item the user may be interested in purchasing that may create a positive emotional response for the user, wherein the image of the item includes a street scene and the item is a home on the street scene, and wherein the image of the different item includes a different street scene in a different geographical location than the image of the item.

2. The visual computing device of claim 1, wherein each of the plurality of cameras is located within a field of view of the user.

3. The visual computing device of claim 1, wherein the visual computing device is a virtual reality device.

4. The visual computing device of claim 1, wherein the visual computing device is an augmented reality device.

5. The visual computing device of claim 4, wherein the augmented reality device further includes one or more outwardly-facing cameras which are oriented away from the face of the user.

6. The visual computing device of claim 1, wherein the image of the different item the user may be interested in purchasing includes a more expensive home than in the image of the item.

7. The visual computing device of claim 1, wherein the image of the different item the user may be interested in purchasing includes a less expensive home than in the image of the item.

8. The visual computing device of claim 1, wherein the image of the item is an automobile, and the image of the different item is a more expensive or less expensive automobile.

9. A method implemented on a virtual reality device, the method comprising:

displaying, by the virtual reality device, a first image to a user, the first image being a street scene comprising a plurality of homes;

orienting one or more inwardly-facing cameras of the virtual reality device towards a face of the user;

capturing a facial expression of the user, using the one or more inwardly-facing cameras, as a result of the user viewing the first image on the virtual reality device, the facial expression comprising a reaction of the user to the first image;

sending the captured facial expression to an electronic computing device;

receiving, from the electronic computing device, a message identifying a user emotion associated with the facial expression, the user emotion associated with the facial expression being identified via a comparison of the captured facial expression with a previous facial expression of the user obtained during a training period;

determining whether the user emotion is negative; and when the user emotion is negative, displaying a second image to the user, the second image being a street scene with different homes than in the first image, and the street scene in the second image being in a different geographical location than street scene in the first image.

10. The method of claim 9, further comprising selecting the second image to produce a positive emotion by the user.

11. The method of claim 9, further comprising:

displaying one or more possible actions to be taken by the user to improve the user emotion; and capturing a second facial expression relating to the one or more possible actions.

12. The method of claim 11, further comprising determining the user emotion associated with the one or more possible actions based upon the second facial expression.

13. The method of claim 9, wherein the second image contains smaller, less expensive homes than the first image.

14. The method of claim 9, wherein the second image contains more expensive homes than the first image.

15. A visual computing device that can be worn by a user, the visual computing device comprising:

a processing unit;

system memory;

a display unit on which one or more virtual images can be projected; and a plurality of cameras, the plurality of cameras being oriented in an inwardly-facing direction towards a face of the user to capture facial reactions of the user;

wherein the system memory encodes instructions that, when executed by the processing unit, cause the visual computing device to:

display, by the display unit, an image to the user, the image being of an item the user may be interested in purchasing;

capture, using one or more of the plurality of cameras, a facial expression of the user as a result of the user viewing the image on the display unit, the facial expression comprising a reaction of the user to the image;

send the captured facial expression to an electronic computing device;

receive, from the electronic computing device, a message identifying an emotion of the user corresponding to the facial expression, the emotion of the user being identified via a comparison of the captured facial expression with a previous facial expression of the user obtained during a training period; and when the emotion corresponding to the captured facial expression is a negative emotion, display, by the display unit, an image of a different item the user may be interested in purchasing that may create a positive emotional response for the user, wherein the image of the item is a vacation scene, and the image of the different item is a vacation scene in a different geographical location than for the image of the item.

* * * * *